US011022551B2

(12) United States Patent
Barnes et al.

(10) Patent No.: US 11,022,551 B2
(45) Date of Patent: *Jun. 1, 2021

(54) TURBIDITY SENSOR WITH IMPROVED FLOW PATH

(71) Applicant: FloDesign Sonics, Inc., Wilbraham, MA (US)

(72) Inventors: Jason Barnes, Westfield, MA (US); Dane Mealey, Somers, CT (US); Jeffrey King, Coventry, CT (US)

(73) Assignee: FloDesign Sonics, Inc., Wilbraham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,170

(22) Filed: Jun. 1, 2020

(65) Prior Publication Data
US 2020/0292451 A1    Sep. 17, 2020

Related U.S. Application Data

(63) Continuation of application No. 16/443,817, filed on Jun. 17, 2019, now Pat. No. 10,670,524, which is a
(Continued)

(51) Int. Cl.
*G01N 21/53*    (2006.01)
*G01N 21/05*    (2006.01)
*G01N 1/20*    (2006.01)

(52) U.S. Cl.
CPC ......... *G01N 21/532* (2013.01); *G01N 1/2035* (2013.01); *G01N 21/05* (2013.01); *G01N 2201/06153* (2013.01)

(58) Field of Classification Search
CPC .. G01N 21/05; G01N 21/532; G01N 15/1404; G01N 2015/0693;
(Continued)

(56) References Cited

U.S. PATENT DOCUMENTS 3,441,737 A * 4/1969 Topol ................. G01N 21/8507
250/564
4,065,675 A * 12/1977 Gold ........................ G01N 1/10
250/576
(Continued)

FOREIGN PATENT DOCUMENTS

DE        10319467 B3    7/2004
GB         2420510 A     5/2006
(Continued)

OTHER PUBLICATIONS

Latt et al.; Ultrasound-membrane hybrid processes for enhancement of filtration properties; Ultrasonics sonochemistry 13.4 (2006): 321-328.
(Continued)

Primary Examiner — Hoa Q Pham
(74) Attorney, Agent, or Firm — FloDesign Sonics, Inc.

(57) ABSTRACT

Systems and methods for increasing the accuracy of a turbidity sensor are disclosed. The systems include a turbidity sensor and a flow module with a specialized flow path, with the turbidity sensor engaging with the flow module such that a measurement zone of the turbidity sensor is disposed within a flow path of the flow module and a bypass path of the flow module does not pass through the measurement zone. The methods include flowing a fluid containing bubbles into a system that separates the fluid in the flow module into a first stream of fluid containing relatively more bubbles and a second stream of fluid containing relatively fewer bubbles, the first stream flowing through a bypass path that does not pass through the measurement zone, and the second stream flowing through the measurement zone of the turbidity sensor.

20 Claims, 16 Drawing Sheets

Related U.S. Application Data continuation of application No. 15/186,302, filed on Jun. 17, 2016, now abandoned.

(60) Provisional application No. 62/180,834, filed on Jun. 17, 2015.

(58) Field of Classification Search
CPC ... G01N 2021/054; G01N 2201/06153; G01N 1/203; G01N 1/2035; A47L 15/4297; D06F 39/004
USPC .................. 356/246, 73, 335–343, 432–440; 250/574
See application file for complete search history.

(56) References Cited

U.S. PATENT DOCUMENTS

| | | | |
|---|---|---|---|
| 4,320,659 A | 3/1982 | Lynnworth et al. | |
| 4,874,243 A * | 10/1989 | Perren | G01N 21/15 356/342 |
| 5,059,811 A | 10/1991 | King et al. | |
| 5,446,544 A * | 8/1995 | Beers | G01N 21/53 356/339 |
| 5,453,832 A * | 9/1995 | Joyce | G01N 21/53 356/338 |
| 5,475,486 A * | 12/1995 | Paoli | G01N 21/05 250/576 |
| 6,307,630 B1 * | 10/2001 | Banerjee | G01N 21/253 356/339 |
| 6,894,778 B2 * | 5/2005 | Palumbo | G01N 21/51 356/338 |
| 7,092,084 B2 * | 8/2006 | Payne | G01N 21/05 356/246 |
| 7,659,980 B1 * | 2/2010 | Mitchell | G01N 21/4785 356/339 |
| 10,670,524 B2 * | 6/2020 | Barnes | G01N 21/05 |
| 2002/0062849 A1 * | 5/2002 | Ekelhoff | A47L 15/4297 134/113 |
| 2004/0216774 A1 * | 11/2004 | Bertram | G01N 21/05 134/113 |
| 2010/0300501 A1 * | 12/2010 | Bohac | A47L 15/4297 134/56 D |
| 2012/0242993 A1 * | 9/2012 | Schick | G01N 21/51 356/442 |
| 2016/0370287 A1 * | 12/2016 | Barnes | G01N 1/2035 |

FOREIGN PATENT DOCUMENTS

| | | |
|---|---|---|
| JP | 410258203 A | 9/1998 |
| JP | 2008290011 A | 4/2008 |
| WO | 2013/043297 | 3/2013 |

OTHER PUBLICATIONS

Meribout et al.; An Industrial-Prototype Acoustic Array for Real-Time Emulsion Layer Detection in Oil Storage Tanks; IEEE Sensors Journal, vol. 9, No. 12, Dec. 2009.

International Search Report and Written Opinion for International Application No. PCT/US2016/038233 dated Sep. 26, 2016.

* cited by examiner

TURBIDITY SENSOR WITH IMPROVED FLOW PATH

CROSS-REFERENCE TO RELATED APPLICATIONS

This application is a continuation of U.S. patent application Ser. No. 16/443,817, filed Jun. 17, 2019, which is a continuation of U.S. patent application Ser. No. 15/186,302, filed Jun. 17, 2016, which claims priority to U.S. Provisional Patent Application Ser. No. 62/180,834, filed on Jun. 17, 2015, the disclosures of all of which are hereby fully incorporated herein by reference in their entirety.

BACKGROUND

Turbidity refers to the cloudiness or haziness of a fluid caused by large quantities of individual particles that are generally invisible to the naked eye, but which can be measured using various types of turbidity sensors. Fluids, such as water, can contain suspended solid matter consisting of particles of many different sizes. While some suspended material will be large enough and heavy enough to settle rapidly to the bottom of the container if a liquid sample is left to stand (the settable solids), very small particles will settle only very slowly or not at all if the sample is regularly agitated or the particles are colloidal. These small, solid particles cause the liquid to appear turbid. Measuring turbidity is a key test of water quality.

Various types of sensors are utilized for turbidity measurement, including those that use an uninterrupted light source or sources and measure the amount of transmitted light or scattered light to determine the turbidity. One issue that occurs with all sensor designs is the presence of bubbles in the fluid stream that is being measured. The diffraction of light through the bubbles distorts the reading, thereby giving an inaccurate turbidity measurement. It would therefore be desirable to provide systems and methods for increasing the accuracy of a turbidity sensor.

BRIEF DESCRIPTION

The present disclosure relates, in various embodiments, to systems for measuring the turbidity of a fluid, and methods for increasing the accuracy of a turbidity sensor by retarding or eliminating bubbles in the fluid stream from passing through the measurement zone of the turbidity sensor, or by otherwise diverting the bubbles around the turbidity sensor, thereby increasing the accuracy of the measurement of the turbidity sensor in the subject fluid. These systems and methods are useful for more accurately measuring the turbidity of a fluid containing bubbles. By placing the turbidity sensor into a flow module having a specialized flow path, the bubbles can be retarded or prevented from flowing into the measurement zone of the turbidity sensor, which thereby increases the accuracy of the turbidity sensor.

Disclosed herein is a system for measuring the turbidity of a fluid. The system includes a turbidity sensor and a flow module. The turbidity sensor has a light source and a measurement zone, and the flow module has a first end, a second end opposite the first end thereof, an inlet, and an outlet. The inlet and the outlet of the flow module define a flow path therebetween. The first end of the turbidity sensor engages with the flow module such that the measurement zone of the turbidity sensor is disposed within the flow path of the flow module; and the flow module includes a bypass path that does not pass through the measurement zone.

In particular embodiments of the system, the inlet of the flow module is located along a first side thereof and the outlet is located along a second side thereof, the first side located opposite the second side. In other embodiments, the inlet and the outlet of the flow module are located along the second end thereof. The inlet of the flow module may be located closer to a bottom end of the flow module than the outlet. The inlet of the flow module may be located below the measurement zone of the turbidity sensor, and the outlet of the flow module may be located above the measurement zone of the turbidity sensor.

In certain constructions of the system, the turbidity sensor extends into the flow module through an opening in the flow module. The opening in the flow module can extend from the first end thereof to the flow path thereof.

The bypass path can run along an inner sidewall of the flow module that extends at least partially about the periphery of an outer sidewall of the turbidity sensor, such that the bypass path extends around the measurement zone of the turbidity sensor and does not pass therethrough.

A fluid-tight seal can be disposed at least partially between the turbidity sensor and the flow module.

The turbidity sensor can be an optical turbidity sensor selected from the group consisting of a single beam turbidity sensor, a ratio beam turbidity sensor, and a modulated four beam turbidity sensor. The turbidity sensor can be an optical turbidity sensor selected from the group consisting of a surface scatter turbidity sensor and a transmittance turbidity sensor.

In particular embodiments, the system has a plurality of turbidity sensors. Each turbidity sensor is plugged into the first end of a common flow module (i.e. one flow module with multiple turbidity sensors extending into the flow module through a plurality of openings in the first end of the flow module). The flow module includes a plurality of compartments, each compartment having an inlet, an outlet, and an opening through which a turbidity sensor is inserted into the compartment. The number of compartments can be equal to the number of turbidity sensors plugged into the flow module.

In certain embodiments, the turbidity sensor further comprises first and second prongs extending outwardly from a base thereof and defining the measurement zone therebetween.

In further accordance with the present disclosure, a method is disclosed for increasing the accuracy of a turbidity sensor. The method includes flowing a fluid containing bubbles into a system. The system includes a turbidity sensor and a flow module. The turbidity sensor has a light source and a measurement zone, and the flow module has a first end, a second end opposite the first end thereof, an inlet, and an outlet. The inlet and the outlet of the flow module define a flow path therebetween. The method further includes placing the turbidity sensor in engagement with the flow module such that the measurement zone of the turbidity sensor is disposed within the flow path of the flow module; separating the fluid in the flow module into a first stream of fluid containing relatively more bubbles and a second stream of fluid containing relatively fewer bubbles, the first stream flowing through a bypass path that does not pass through the measurement zone to the outlet, and the second stream flowing through the measurement zone of the turbidity sensor; and measuring the turbidity of the second stream as the second stream flows through the measurement zone of the turbidity sensor.

In some embodiments, the fluid is continuously flowed through the system.

In certain embodiments, the step of placing the turbidity sensor in engagement with the flow module includes placing the turbidity sensor into the flow module through an opening in the flow module. The opening in the flow module can extend from the top end thereof to the flow path thereof.

The fluid can contain cells or cell debris and be processed in a cell bioreactor before being flowed into the system.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
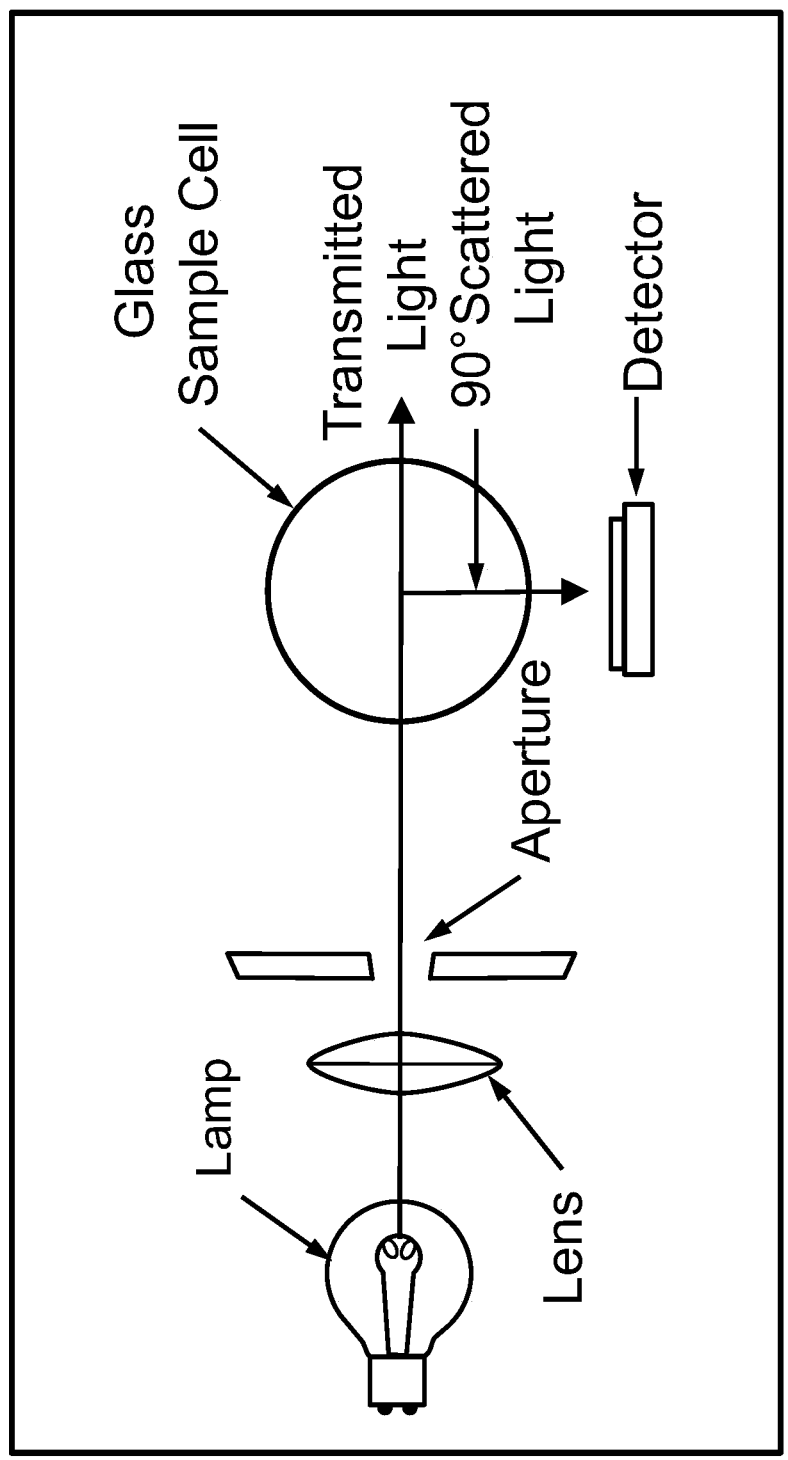
FIG. 1 is a schematic illustration of a single beam turbidity sensor or turbidimeter.

The present disclosure may be understood more readily by reference to the following detailed description of desired embodiments and the examples included therein. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named component and allowing the presence of other components. The term "comprising" should be construed to include the term "consisting of", which allows the presence of only the named component, along with any impurities that might result from the manufacture of the named component.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

The modifier "about" used in connection with a quantity is inclusive of the stated value and has the meaning dictated by the context. When used in the context of a range, the modifier "about" should also be considered as disclosing the range defined by the absolute values of the two endpoints. For example, the range of "from about 2 to about 10" also discloses the range "from 2 to 10." The term "about" may refer to plus or minus 10% of the indicated number. For example, "about 10%" may indicate a range of 9% to 11%, and "about 1" may mean from 0.9-1.1.

It should be noted that many of the terms used herein are relative terms. For example, the terms "upper" and "lower"

are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. It should be noted that in a loop, a first component can be described as being both upstream of and downstream of a second component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" and "downwards" are also relative to an absolute reference; upwards is always against the gravity of the earth.

The term "parallel" should be construed in its lay sense of two surfaces that maintain a generally constant distance between them, and not in the strict mathematical sense that such surfaces will never intersect when extended to infinity.

Currently, the Environmental Protection Agency (EPA) has approved three methods for the measurement of turbidity, as described in 30 C.F.R. § 141.74. Briefly, § 141.74 provides that systems must utilize turbidimeters that conform to one of several enumerated methods for compliance purposes. If the instrument does not conform, it may not be used for monitoring under the requirements of the Interim Enhanced Surface Water Treatment Rule (IESWTR).

EPA method 180.1, "Determination of Turbidity by Nephelometry," is found in the Agency's publication, *Methods for Chemical Analysis of Water and Wastes*. The method is based upon a comparison of the intensity of light scattered by a sample under defined conditions, with the intensity of light scattered by a standard reference suspension. The higher the intensity of scattered light, the higher the turbidity. Readings, in Nephelometric Turbidity Units (NTUs), are made in a nephelometer designed according to specifications laid out in the EPA method. A primary standard suspension is used to calibrate the instrument. A secondary standard suspension is used as a daily calibration check and is monitored periodically for deterioration using one of the primary standards. For further information, see Appendix B for EPA Method 180.1.

Standard Method 2130B, found in Standard Methods (1995), is similar to EPA Method 180.1. The 2130B method is also based on a comparison of the intensity of light scattered by the sample under defined conditions, with the intensity of light scattered by a standard reference suspension under the same conditions. Again, the higher the intensity of scattered light, the higher the turbidity. Formazine polymer is used as the primary standard reference suspension.

Great Lakes Instruments Method 2 is an instrument-specific, modulated four beam method using a ratiometric algorithm to calculate the turbidity value from the four readings that are produced. The comparison is also based on a comparison of light scattered by the sample under defined conditions with the intensity of the light scattered by the reference suspension. Once again, the higher the intensity of the scattered light, the higher the turbidity. Readings, in NTUs, are made in a nephelometer designed according to specifications in the method.

Various light-source turbidity sensors employing the above-described methods or other methods are known in the art.

A single beam design configuration, such as that shown in FIG. 1, is the most basic turbidimeter design. The single beam design uses only one light source and one photodetector located at 90° from the incident light. The single beam design is the oldest of the modern nephelometers and is typically used with a polychromatic tungsten filament lamp. The design is still in wide use today and yields accurate results for turbidity under 40 NTU, provided that samples have little natural color. In fact, many on-line instruments in use today still utilize the single beam design. The single beam design does, however, have limited accuracy at higher turbidities. As turbidity increases and the amount of scattered light increases, multiple scattering can occur when light strikes more than one particle as it reacts with the sample fluid. The resulting scattered light intensity reaching the 90° detector can diminish as the instrument effectively "goes blind." For this reason, a single beam design conforming strictly to EPA Method 180.1 does not typically demonstrate stable measurement capability at high turbidities and is generally only applicable for turbidity readings from 0 to 40 NTU. The design of the single beam instrument is also limited by the need for frequent recalibration of the instrument due to the decay of the incandescent light source. Because of the polychromatic nature of the light source, these instruments may also demonstrate poor performance with samples containing natural color. Since most treated water samples have low or no color, use of the single beam design can be appropriate for such applications.

Figure 2:
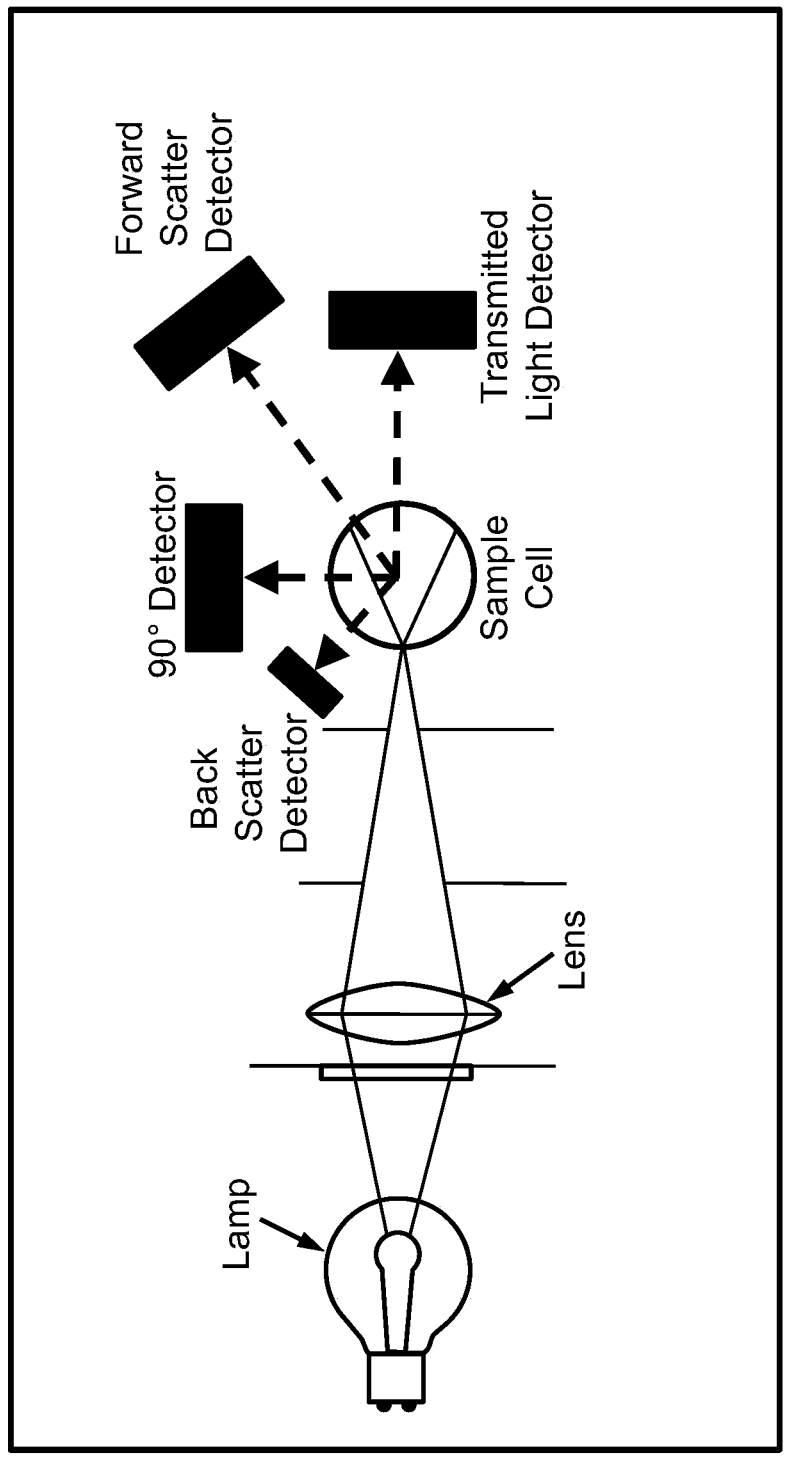
FIG. 2 is a schematic illustration of a ratio beam turbidity sensor or turbidimeter.

The ratio beam turbidimeter design expands upon the single beam concept, but includes additional photodetectors located at other angles than 90° from the incident light. As shown in the exemplary ratio beam turbidimeter design depicted in FIG. 2, the ratio beam design utilizes a forward scatter detector, a transmitted light detector, and for very high turbidity applications, a back scatter detector. The signals from each of these detectors are mathematically combined to calculate the turbidity of the sample. A typical ratio mathematical algorithm is as follows (Standard Methods, 1995):

$$T = \frac{I_{90}}{d_0 I_t + d_1 I_{fs} + d_2 I_{bs} + d_3 I_{90}}$$

where T is the turbidity in NTUs, $d_0$, $d_1$, $d_2$, and $d_3$ are calibration coefficients, $I_{90}$ is 90° detector current, $I_t$ is transmitted detector current, $I_{fs}$ is forward scatter detector current, and $I_{bs}$ is back scatter detector current. The use of multiple photodetectors and the ratio algorithm gives the instrument much better performance with colored samples. The transmitted light and the 90° scattered light are affected almost equally by the color of the sample because they travel nearly the same distance through the sample volume. When the ratio of the two readings is taken, the effects of color absorption on the two readings tend to cancel mathematically.

Figure 3:
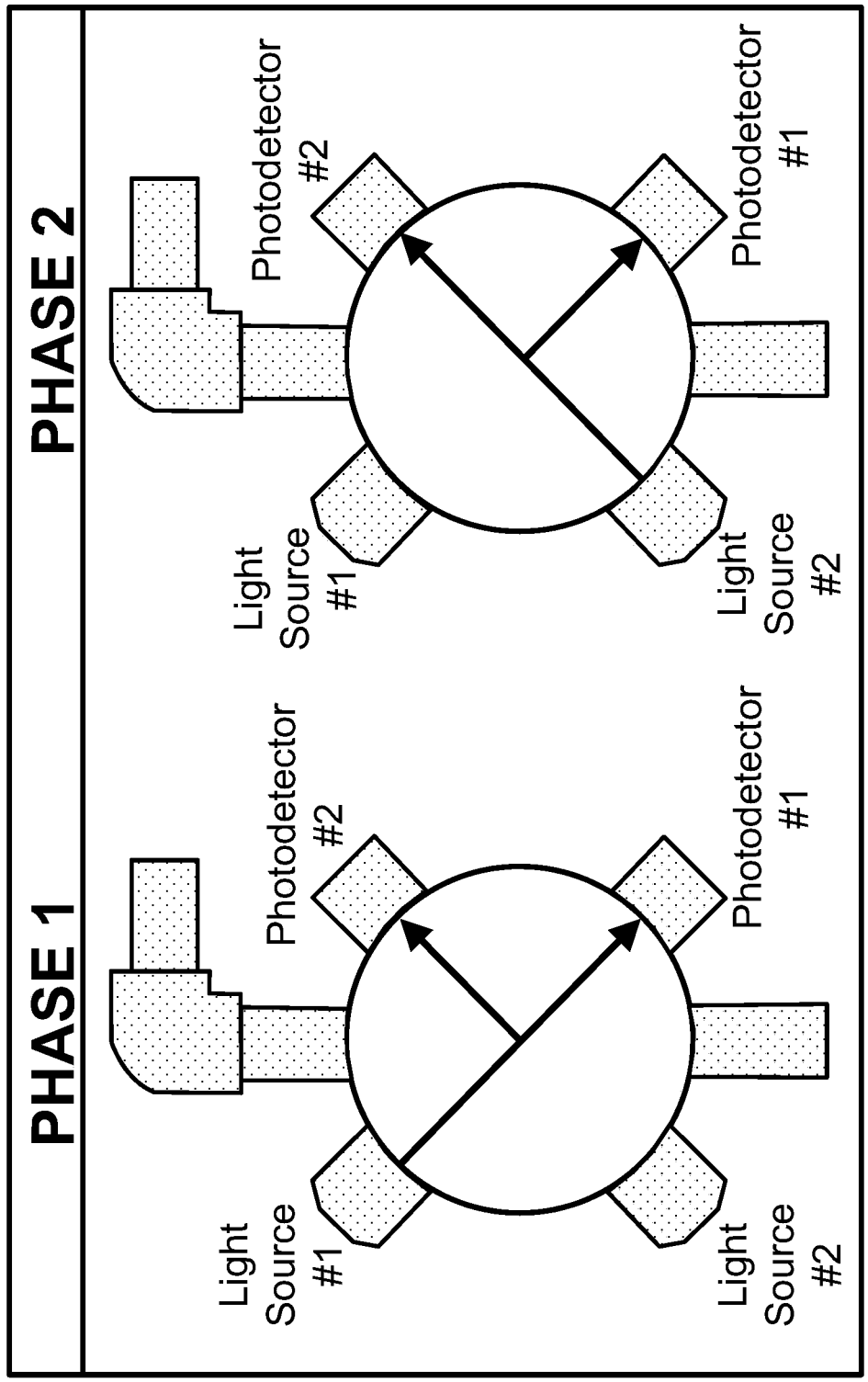
FIG. 3 is a schematic illustration of a modulated four beam turbidity sensor or turbidimeter.

Unlike the single beam and ratio beam turbidimeters, a modulated four beam instrument design utilizes two light sources and two photo detectors. The two sources and the two detectors are used to implement the theory of ratio measurements to cancel errors. As shown in the exemplary modulated forum beam ratio sensor depicted in FIG. 3, the light sources and detectors are located at 90° around the sample volume. This design takes two measurements every 0.5 seconds. In the first phase (left side), light from Light Source #1 is pulsed directly into Photodetector #1, while Photodetector #2 simultaneously measures the light scattered from this pulse at a 90° angle. In the second phase (right side), light from Light Source #2 is pulsed directly into Photodetector #2, while Photodetector #1 simultaneously measures the light scattered from this pulse at a 90° angle. In both phases, the signal from the photodetector receiving the direct light signal is the active signal, while the signal from the photodetector measuring scattered light is called the reference signal. In this way, the two phase measurements provide four measurements from two light sources: two reference signals and two active signals. The turbidity of the sample is calculated from the four independent measurements taken from the two light sources using a mathematical algorithm similar to the algorithm used by the ratio instrument design. The result is that errors resulting from sample color appear in both the numerator and denominator of the mathematical algorithm, and the errors are mathematically canceled. Like the ratio design, the mathematical algorithm used in the four beam design allows for more sensitivity in highly turbid samples and extends the range of the instrument to about 100 NTU. The error cancellation achieved by the algorithm also makes the instrument very accurate in the 0 to 1 NTU range.

Figure 4:
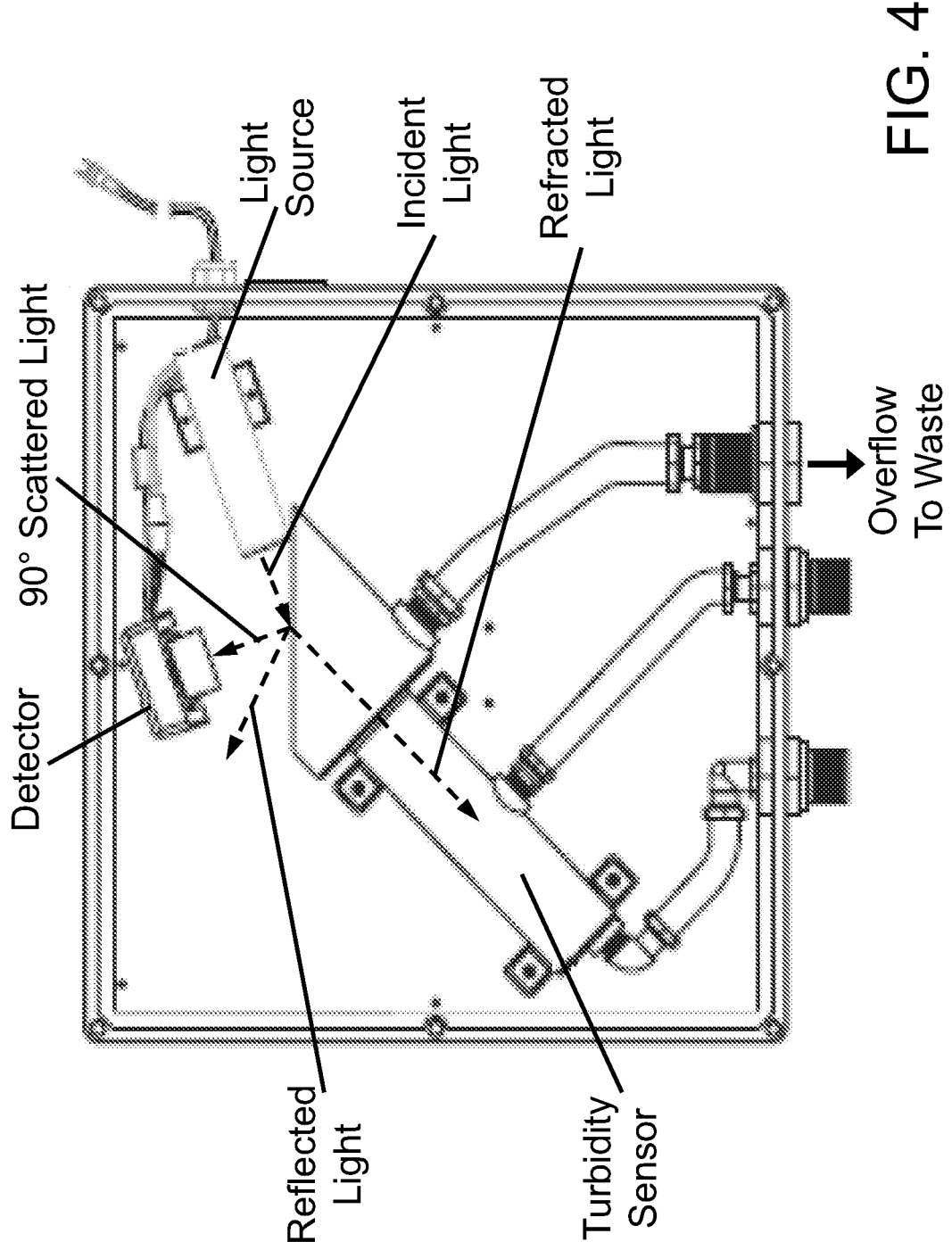
FIG. 4 is a schematic illustration of a surface scatter turbidity sensor or turbidimeter.

As turbidity increases, light scattering intensifies and multiple scattering can occur as light strikes more than one particle as it interacts with the fluid. Light absorption by particles can also significantly increase. When particle concentration exceeds a certain point, the amount of transmitted and scattered light decreases significantly due to multiple scattering and absorption. This point is known as the optical limit of an instrument. The surface scatter design utilizes a light beam focused on the sample surface at an acute angle. In the exemplary surface scatter design depicted in FIG. 4, light strikes particles in the sample and is scattered toward a photodetector that is also located above the sample surface. As turbidity increases, the light beam penetrates less of the sample, thus shortening the light path and compensating for interference from multiple scattering. These instruments are best suited for measuring high turbidities such as are present in raw water and recycle streams. These designs are not, however, currently approved by the EPA.

Instruments utilizing a transmittance design are often referred to as turbidimeters, but these instruments do not measure true turbidity of water in NTUs. These instruments are better termed "absorptometers," as they measure the amount of light transmitted through a sample rather than the amount of light scattered by a sample. Light transmittance is measured by introducing a light source to a sample volume and measuring the relative amount of light transmitted through the sample volume to a photodetector located opposite the light source. Transmittance values are reported as 0 to 100 percent of the incident light source transmitted through the sample. The use of absorptometers in water treatment has generally been restricted to monitoring spent filter backwash water to determine relative cleanliness of the filter media. Like surface scatter instruments, these transmittance absorptometers are not currently approved by the EPA.

In all of the previously described sensor designs, there exists the potential for bubbles to appear in the fluid stream that is being measured. The existence of bubbles in the sensor area is undesirable because diffraction of light through the bubbles causes light scattering that is not due to the presence of suspended solids. This distorts the reading, thereby giving a false turbidity measurement.

The present disclosure relates to systems for measuring the turbidity of a fluid and methods for increasing the accuracy of a turbidity sensor. The systems and methods include a turbidity sensor and a flow module with a specialized flow path designed to retard or eliminate bubbles in a fluid from passing through the turbidity sensor, or to minimize their accumulation in the measurement zone of the turbidity sensor, or to otherwise divert the bubbles around the turbidity sensor, thereby increasing the accuracy of the measurement of the turbidity sensor in the subject fluid.

Figure 5:
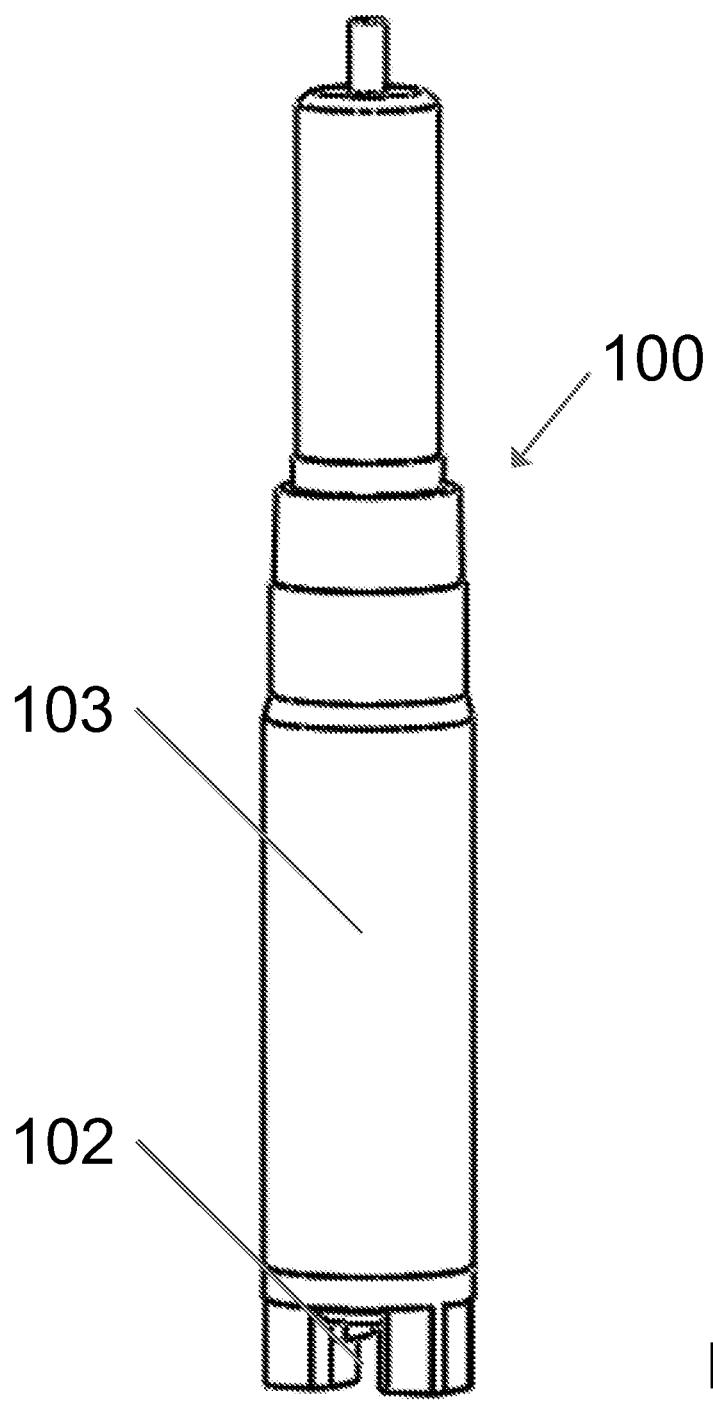
FIG. 5 is a perspective view of a first exemplary embodiment of a turbidity sensor according to the present disclosure. The turbidity sensor has a measurement zone at the lower end thereof.
Figure 6:
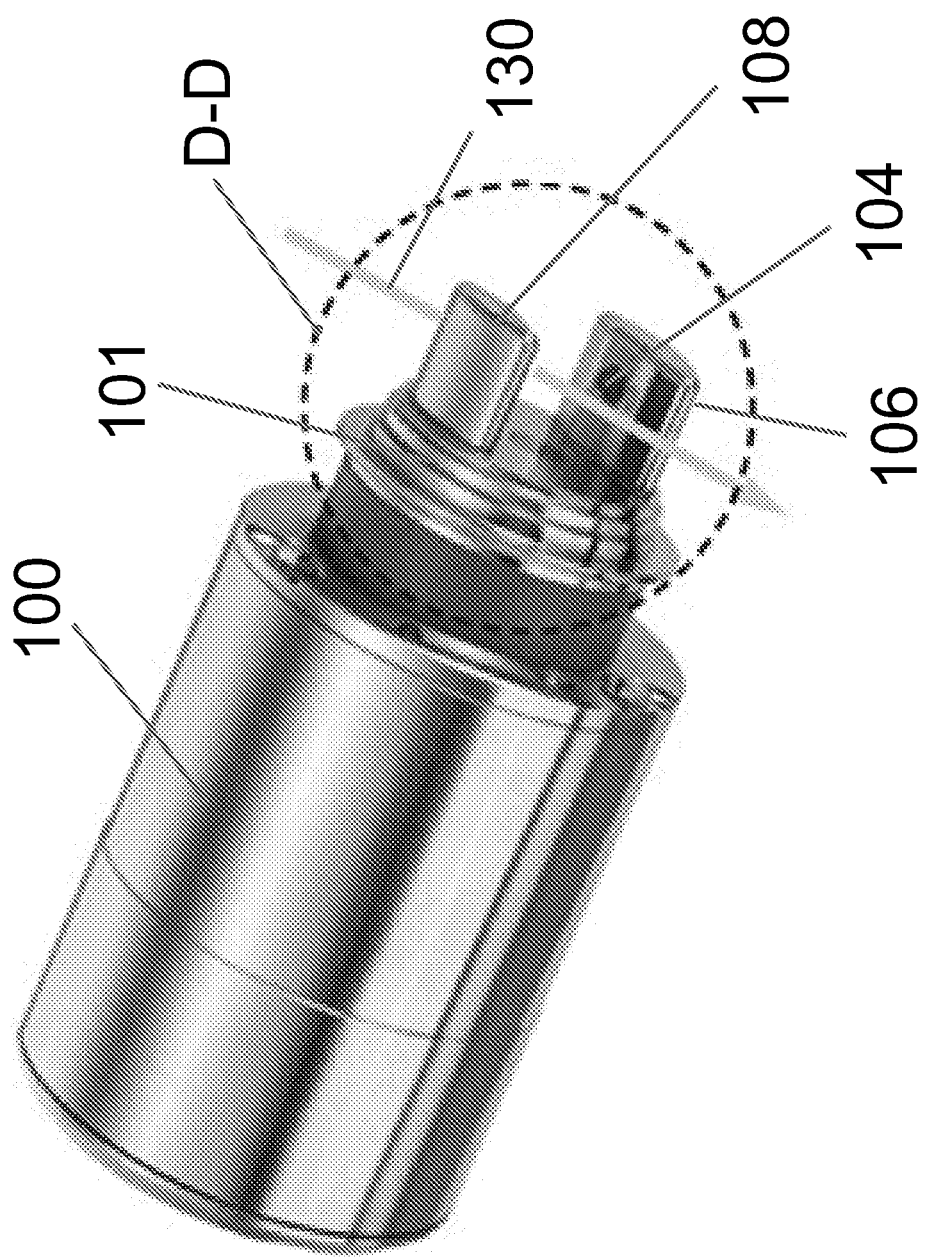
FIG. 6 is an enlarged view of the lower end of the first exemplary turbidity sensor of FIG. 5. The turbidity sensor has first and second prongs extending outwardly from a base thereof.

FIG. 5 shows an exemplary embodiment of a turbidity sensor 100 according to the present disclosure. As can be seen in FIG. 5 and FIG. 6, the turbidity sensor generally includes a light source 104 (e.g. an LED light source) and a measurement zone 102. The measurement zone 102 serves as the area through which the fluid to be measured for turbidity flows. As will be appreciated by those skilled in the art, the turbidity sensor 100 can be any suitable turbidity sensor or turbidimeter, such as those shown in FIGS. 1-4 and described above. That is, it is specifically contemplated that the turbidity sensor can be an optical turbidity sensor, such as a single beam turbidity sensor or turbidimeter, a ratio beam turbidity sensor or turbidimeter, a modulated four beam turbidity sensor or turbidimeter, a surface scatter turbidity sensor or turbidimeter, or a transmittance turbidity sensor or turbidimeter. The turbidity sensor 100 generally includes an outer sidewall 103 that extends about the periphery of the turbidity sensor 100 and defines an outer shell of the turbidity sensor 100.

Figure 7:
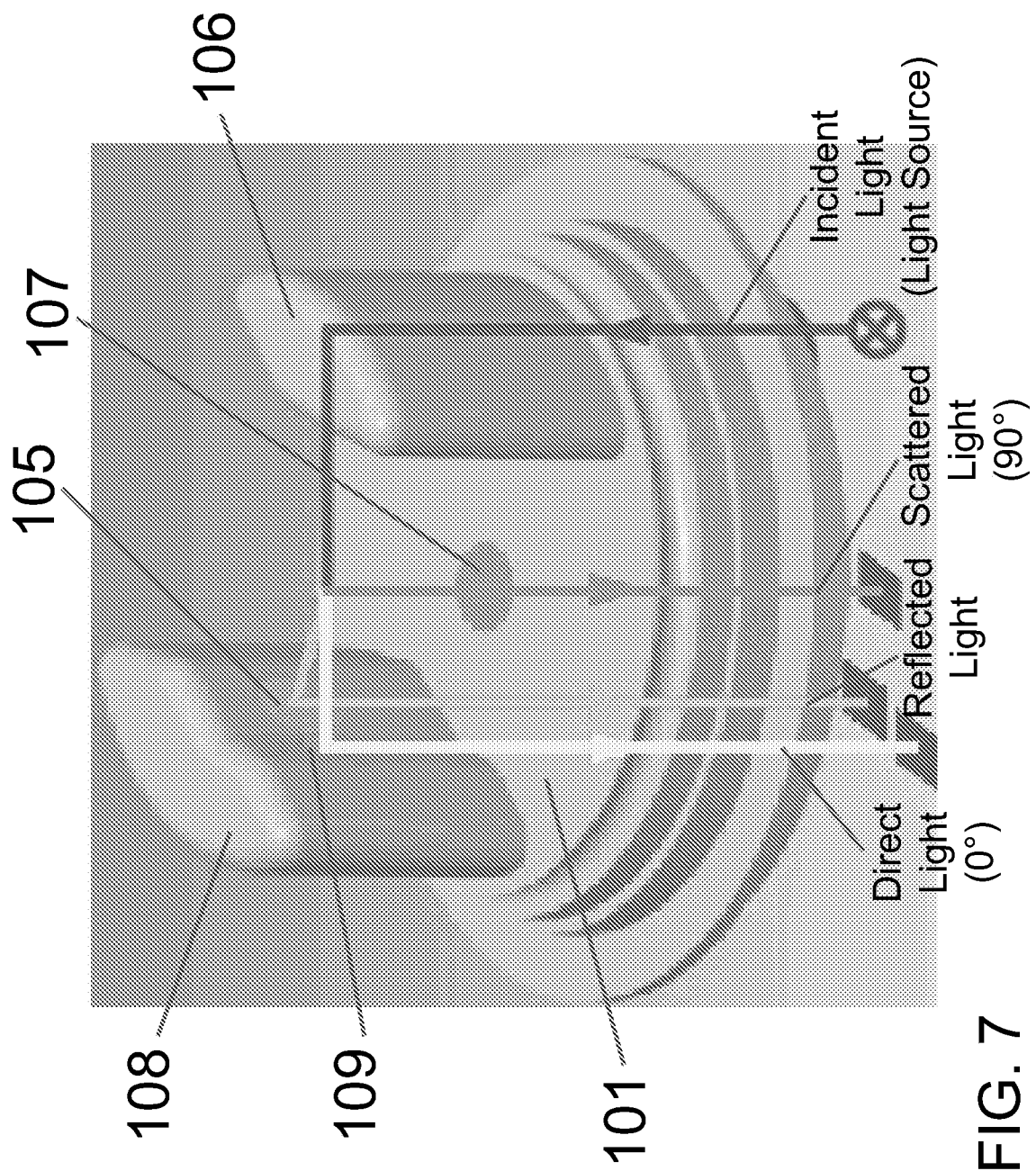
FIG. 7 is a magnified view of section D-D of FIG. 6. The turbidity sensor has a light source in the first prong, a first detector in the second prong, and a second detector in the base thereof.

FIG. 6 and FIG. 7 show enlarged and magnified views of a primary end of an exemplary turbidity sensor. FIG. 7 is a magnified view of section D-D of FIG. 6. The exemplary turbidity sensor 100 depicted in FIG. 6 includes a first prong 106 and a second prong 108. The first and second prongs 106, 108 extend outwardly from a primary end of the turbidity sensor 100, the primary end including an end surface 101. As can be best seen in FIG. 6, the light source 104 is located in the first prong 106. As represented in FIG. 7, as a fluid stream containing particles is flowed through the measurement zone 102 of the turbidity sensor 100, light is emitted from the light source 104 toward a first detector 105. The light reflects off particles in the fluid stream. The reflected light can be measured by the first detector 105, 90° scattered light can be measured by a second detector 107 (e.g., a back or forward scatter detector), and direct light (i.e., light transmitted at a 0° angle from the light source 104) can be measured by a third detector 109 (e.g., a transmitted light detector). In the exemplary turbidity sensor 100 shown in FIG. 7, the first detector 105 and the third detector 109 are located in the second prong 108 and the second detector 107 is located in the primary end of the turbidity sensor 100. In this way, the first and second prongs 106, 108 and the end surface 101 define the measurement zone 102 therebetween. Of course this is only one representation of the turbidity sensor.

Figure 8:
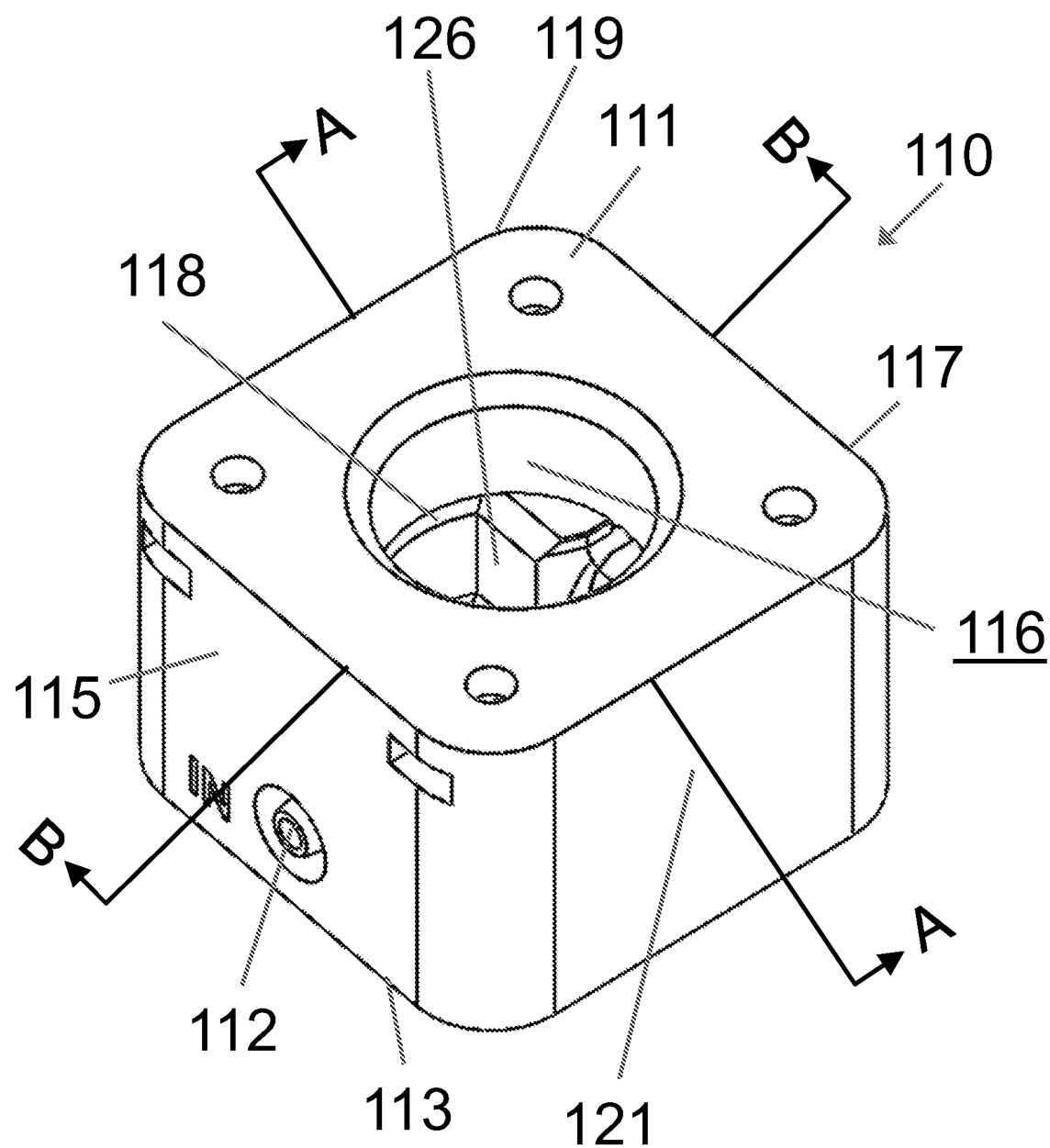
FIG. 8 is a perspective view of a first exemplary embodiment of a flow module according to the present disclosure. The flow module has an opening extending from a top end thereof to a flow path thereof.

An exemplary embodiment of a flow module 110 according to the present disclosure is shown in FIG. 8, where the flow module has a vertical orientation. Generally speaking, the flow module is a solid structure/housing that is used to shape different flow paths for the fluid whose turbidity is being measured, and in which the turbidity sensor is located. The flow module 110 has a first end 111, a second end 113 opposite the first end, a first side 115, and a second side 117 opposite the first side. Here, the first end is a top end, and the second end is a bottom end of the flow module. As depicted, the flow module 110 is cubic in shape, though it is to be understood that the flow module 110 can be of any suitable shape. A third side 119 is opposite a fourth side 121 of the flow module. The flow module 110 further includes an opening 116 in the first end 111 thereof. As will be explained in greater detail herein, the opening 116 may be of any suitable size and shape and is generally designed to receive the primary end of the turbidity sensor 100.

The flow module 110 generally includes an inner sidewall 118 that defines the opening 116 in the first end of the flow module. When a turbidity sensor is placed into the opening 116 of the flow module 110 in engagement with the flow module 110, the inner sidewall 118 of the flow module 110 generally extends at least partially about the outer sidewall 103 of the turbidity sensor 100 (see FIG. 5).

Figure 9:
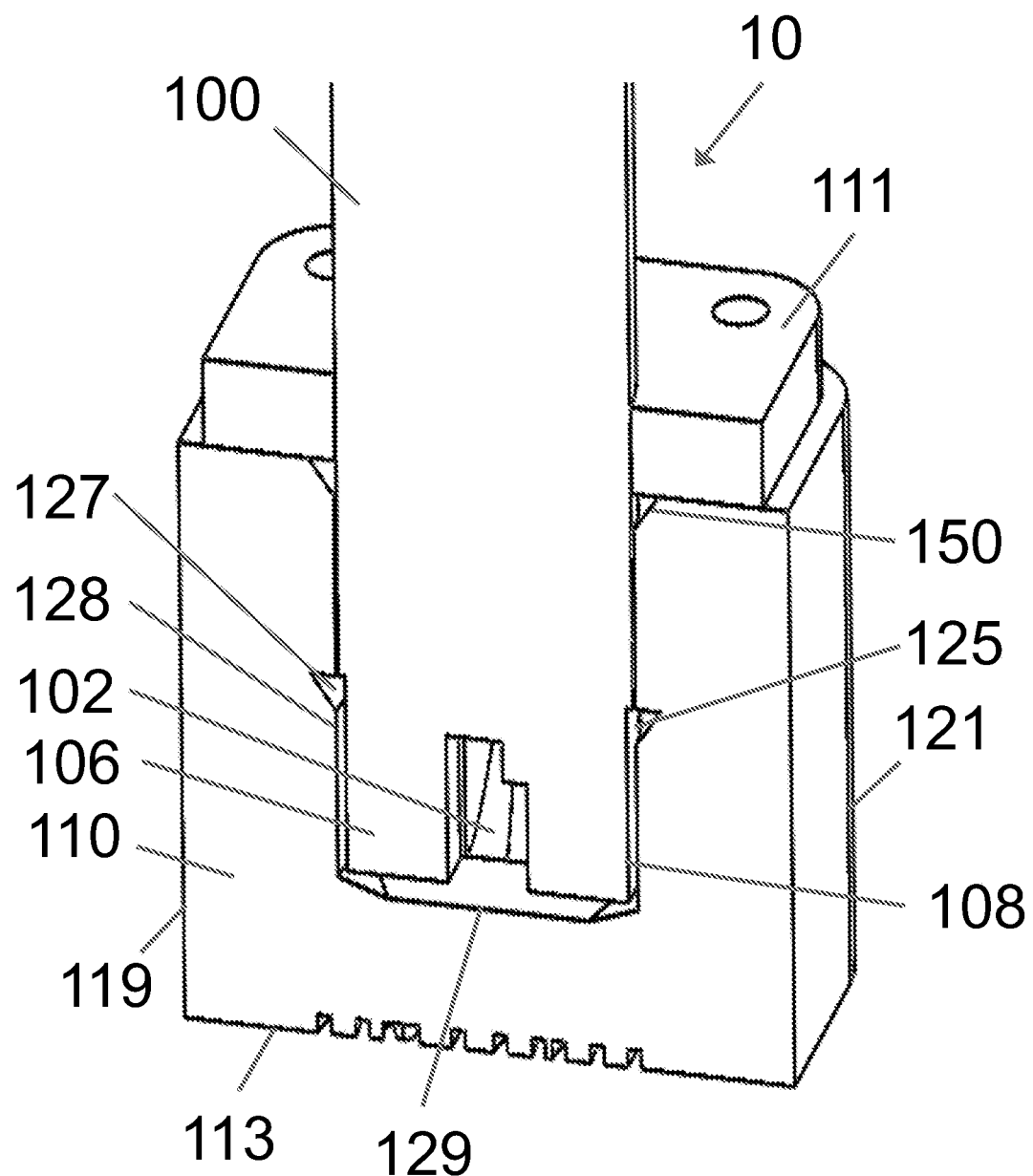
FIG. 9 is a perspective cross-sectional view of a first exemplary system including a turbidity sensor and a flow module according to the present disclosure, along line A-A of FIG. 8.

Turning now to FIG. 9, a cross-sectional view of the system 10 is shown in which the turbidity sensor 100 is in engagement with the flow module 110. This view is through line A-A of FIG. 8. The turbidity sensor 100 extends into the flow module 110 through the first end 111 of the flow module 110. More specifically, the turbidity sensor 110 extends into the flow module 110 through the opening in the first end 111 thereof. As depicted, the measurement zone 102 of the turbidity sensor 100 is completely contained within the flow module 110. Put another way, when the turbidity sensor 100 is in engagement with the flow module 110, the measurement zone 102 of the turbidity sensor 100 is disposed within the flow module 110 between the first end 111 and the second end 113 of the flow module 110. The prongs 106, 108 of of the turbidity sensor are located to the sides of the flow path between the inlet 112 and the outlet 114. Put another way, the fluid flowing through the measurement zone 102 generally flows in a straight line from the inlet 112 to the outlet 114, and does not have to travel around one of the prongs to enter the measurement zone.

Figure 10:
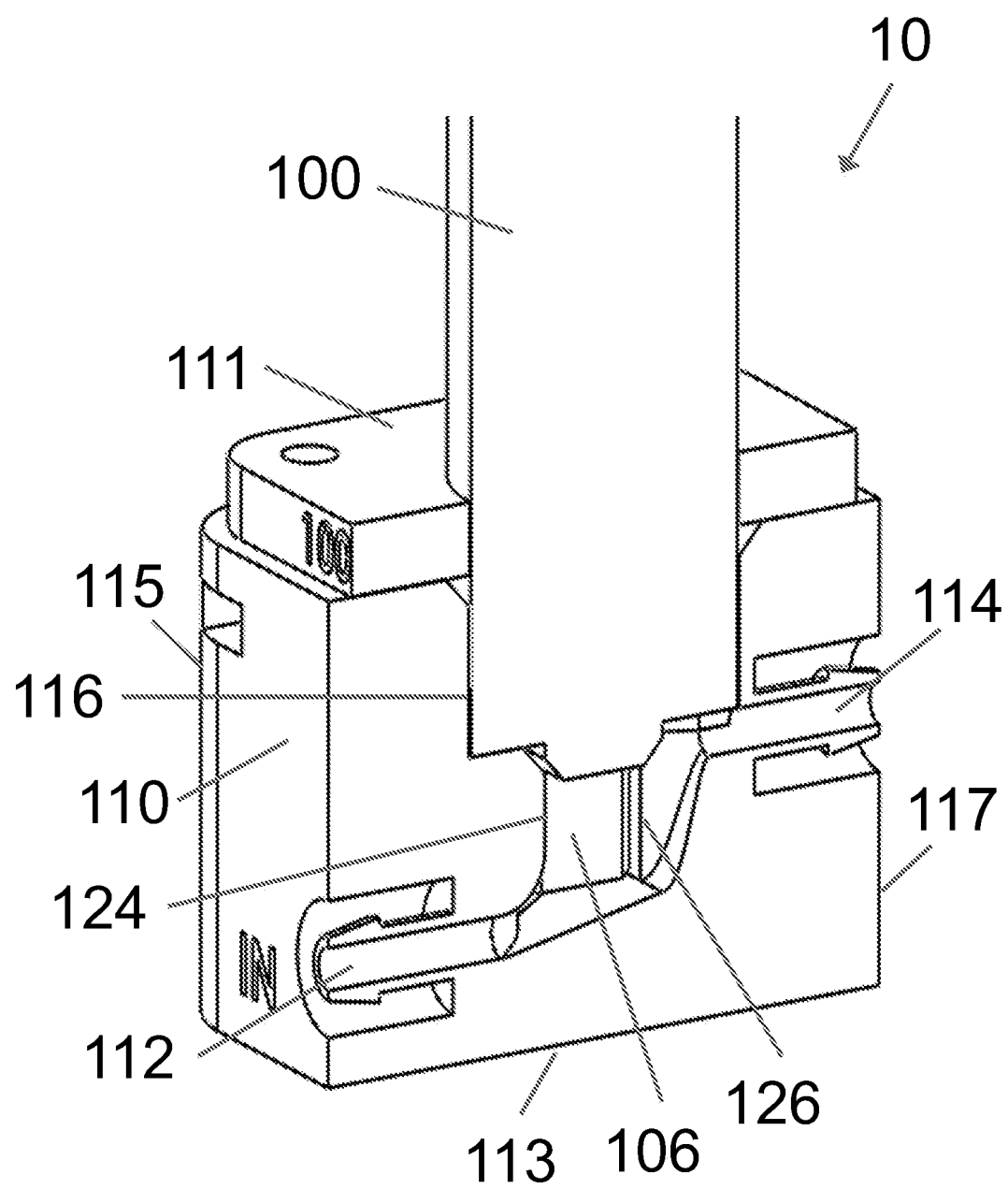
FIG. 10 is another perspective cross-sectional view of the first exemplary system of FIG. 9, taken along line B-B of FIG. 8. The flow module includes an inlet and an outlet defining a flow path therebetween. The inlet of the flow module is located closer to the bottom end of the flow module than the outlet.
Figure 11:
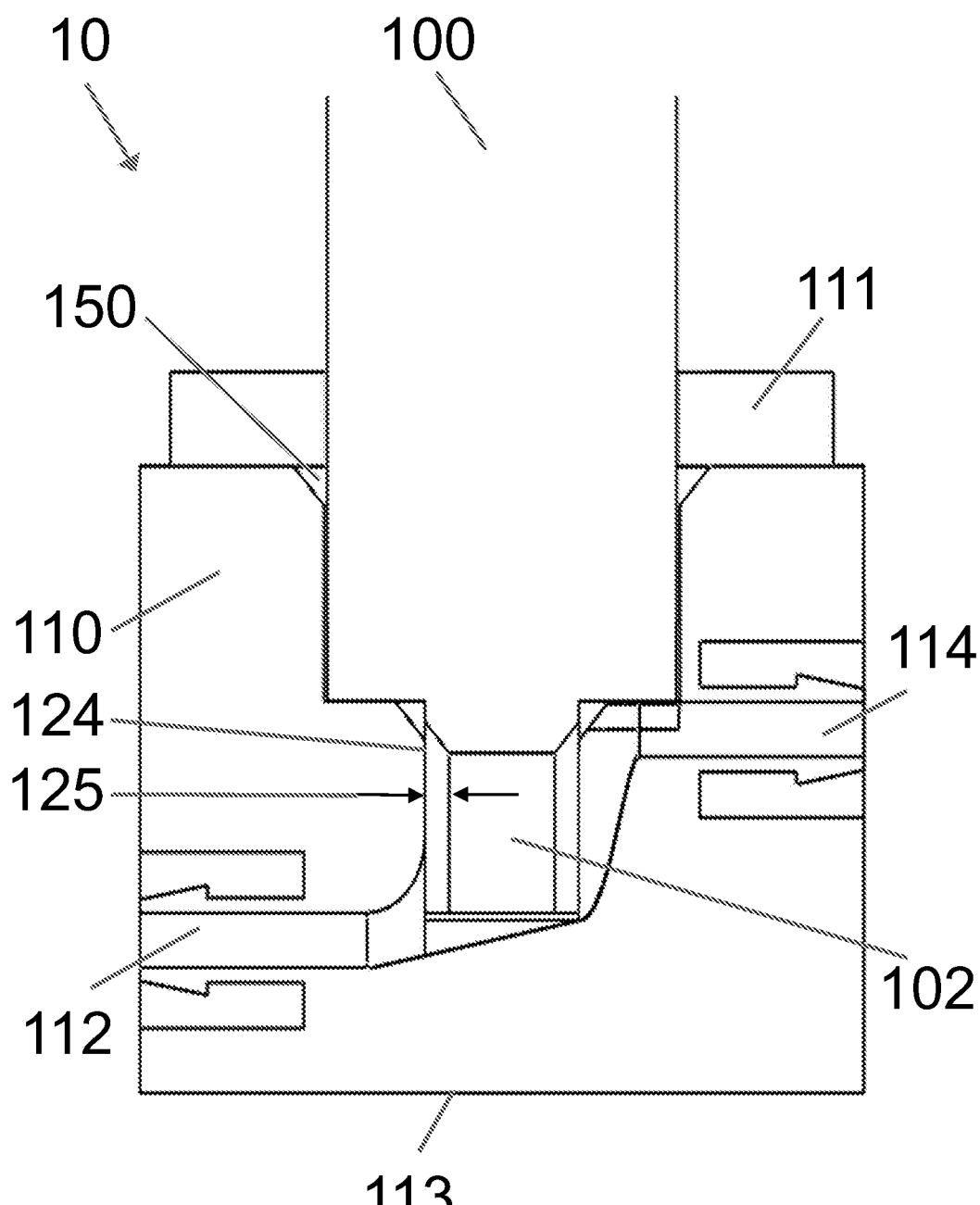
FIG. 11 is a front cross-sectional view of the first exemplary system of FIG. 9. The turbidity sensor engages with the flow module such that the measurement zone of the turbidity sensor is disposed within the flow path of the flow module. The inlet of the flow module is located below the measurement zone of the turbidity sensor and the outlet of the flow module is located above the measurement zone of the turbidity sensor.

FIG. 10 and FIG. 11 show additional cross-sectional views of the system 10 with the turbidity sensor 100 in engagement with the flow module 110, taken along line B-B of FIG. 8. In FIG. 10 and FIG. 11, it can be seen that the flow module 110 includes an inlet 112 on the first side 115 of the flow module 110 and an outlet 114 on the second side 117 of the flow module 110. In the exemplary embodiment of the flow module 110 shown in FIG. 10 and FIG. 11, the first side 115 of the flow module 110 is located opposite the second side 117 thereof. In this regard, the inlet 112 is located on an opposite side of the flow module 110 from the outlet 114. The inlet 112 and the outlet 114 of the flow module 110 define a flow path therebetween through which a fluid may flow. The measurement zone 102 of the turbidity sensor 100 extends into and is disposed within the flow path of the flow module 110 when the turbidity sensor 100 is in engagement with the flow module 110. In this regard, it is noted that the opening 116 in the flow module 110 extends from the first end 111 of the flow module 110 to the flow path thereof, with the turbidity sensor 100 generally filling the opening 116 between the first end 111 of the flow module 110 and the flow path. A fluid-tight seal 150 (e.g., an O-ring) can be disposed at least partially between the turbidity sensor 100 and the flow module 110, such as between the outer sidewall of the turbidity sensor 100 and the inner sidewall of the flow module 110 as shown in FIG. 9, or such as between the opening 116 of the flow module 110 and the turbidity sensor 100 as shown in FIG. 11. The fluid-tight seal generally prevents fluid flowing through the flow module 110 from escaping the flow path of the flow module 110.

As can be best seen in the exemplary embodiment of the flow module 110 shown in FIG. 11, the inlet 112 is located closer to the second end 113 of the flow module 110 than the outlet 114. Put another way the vertical distance between the inlet and the second end is less than the vertical distance between the outlet and the second end, or the outlet is higher on the flow module than the inlet. Put yet another way, water flows at an angle upwards through the flow module. Moreover, when the turbidity sensor 100 is in engagement with the flow module 110, such as is shown in FIG. 11, the inlet 112 is located below the measurement zone 102 of the turbidity sensor 100, while the outlet 114 is located above the measurement zone 102 of the turbidity sensor 100.

Figure 12:
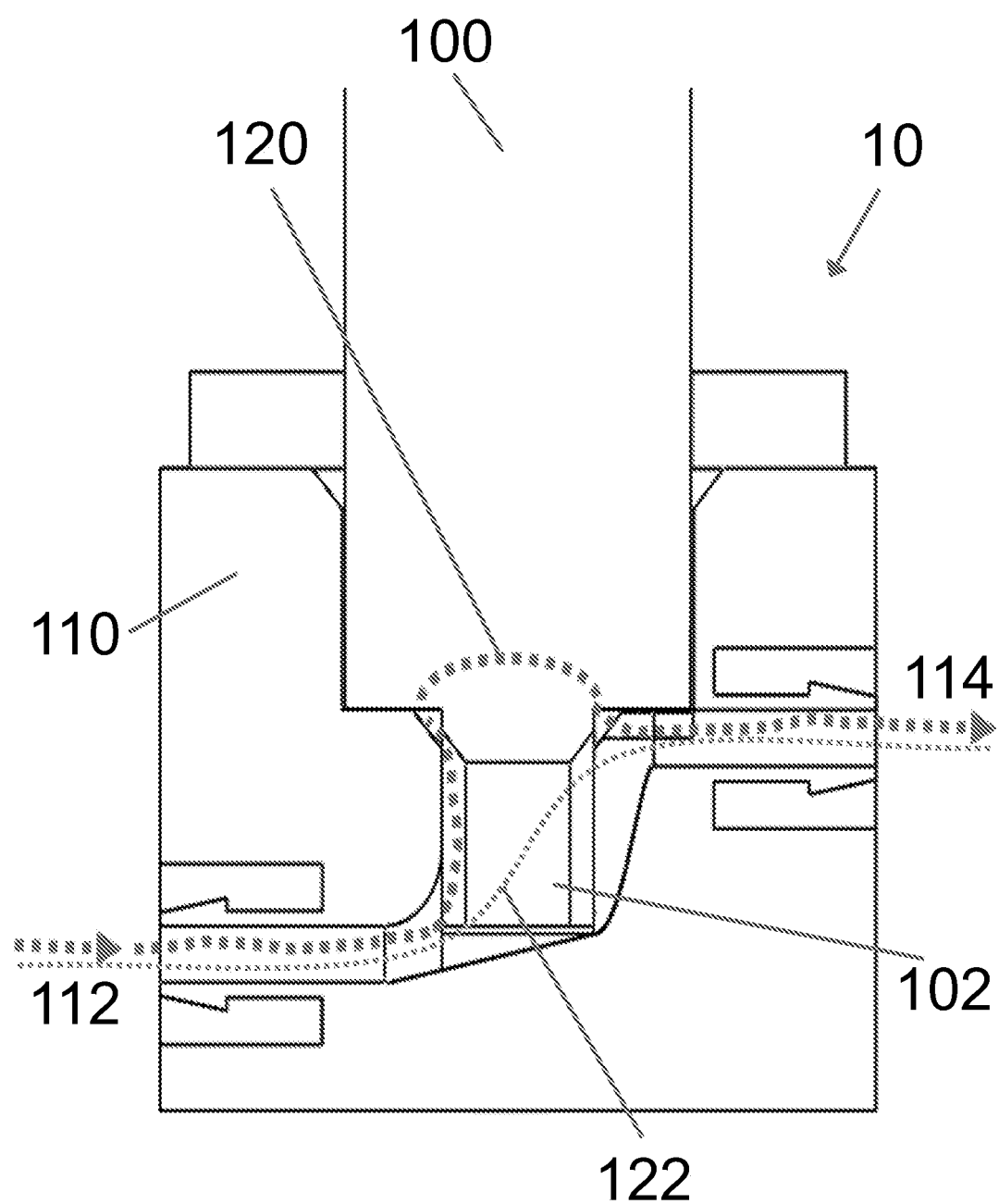
FIG. 12 is another front cross-sectional view of the first exemplary system of FIG. 9, illustrating the flow paths of a first fluid stream containing bubbles through the system around the measurement zone of the turbidity sensor, and a second fluid stream containing relatively fewer bubbles compared to the first fluid stream, which passes through the measurement zone of the turbidity sensor.
Figure 13:
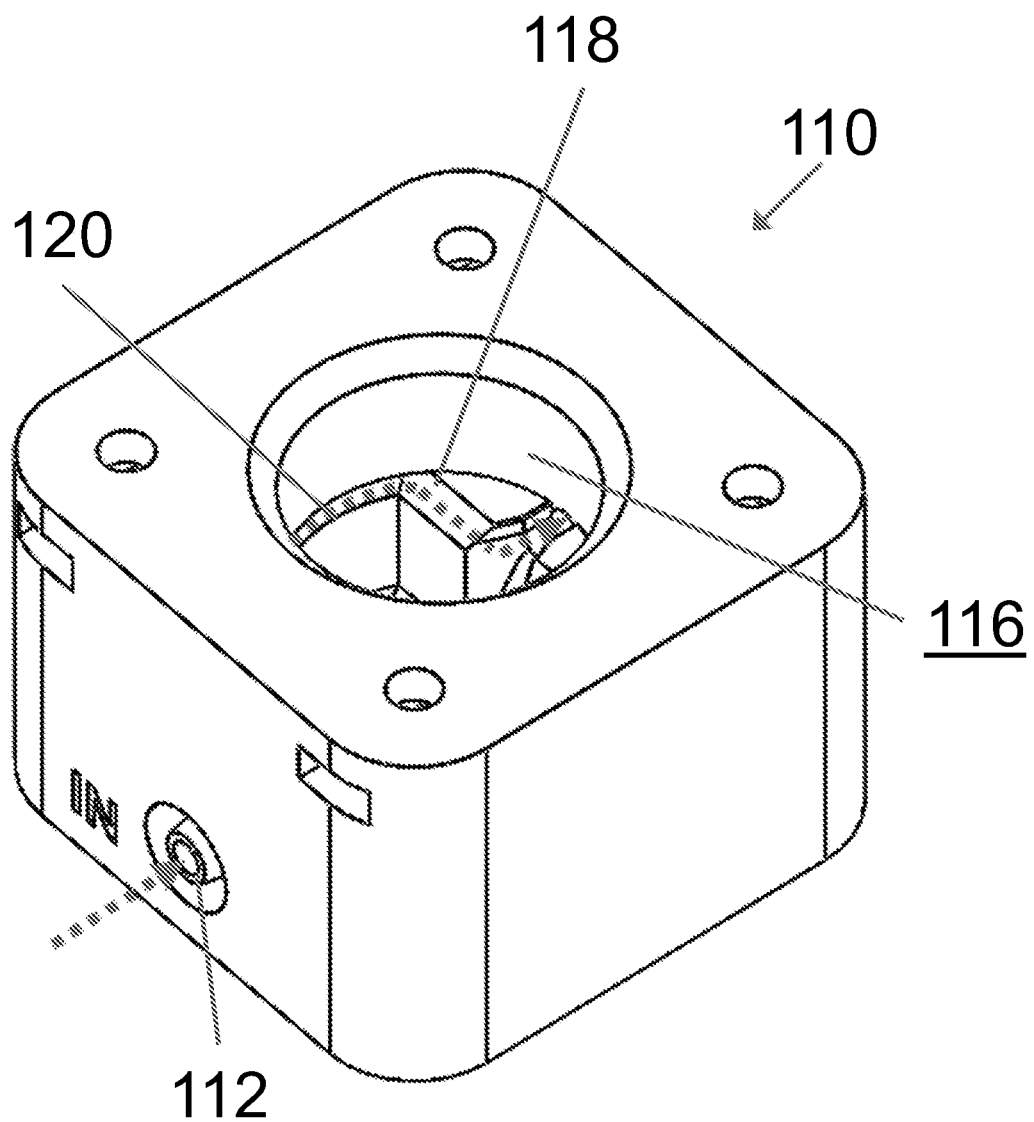
FIG. 13 is a perspective view of the first exemplary flow module of FIG. 8 illustrating the flow path of a fluid stream containing bubbles through the flow module.

The interior walls of the flow module 110 are shaped to engage the turbidity sensor and create a flow path through the measurement zone of the turbidity sensor. The interior walls also form a bypass path through which fluid can flow around the measurement zone, i.e. the fluid in the bypass path does not pass through the measurement zone. For example, in one embodiment, a fluid containing bubbles is flowed into the flow module 110. The fluid can be continuously flowed through the flow module 100. Upon being flowed into the flow module 110, the fluid is subsequently separated into a first stream 120 of fluid containing relatively more bubbles and a second stream 122 of fluid relatively free of bubbles. The amount of bubbles in the first stream 120 and the second stream 122 is relative to each other, i.e. the first stream always contains more bubbles than the second stream 122. As shown in FIG. 12, the first stream 120 and the second stream 122 flow together into the flow module 110 via the inlet 112. At this point in time, they can be considered a single fluid stream. Due to the presence of the bubbles in the first stream 120, the first stream 120 flows through the bypass path of the flow module 110 around the measurement zone 102 of the turbidity sensor 100. As illustrated here, the first fluid stream 120 flows upward through a path that goes around the measurement zone 102. The first stream 120 is then flowed out of the flow module 110 through the outlet 114 thereof. In this way, the path of the first stream 120 through the flow module 110 is such that the first stream containing relatively more bubbles does not pass through the measurement zone 102. Another view of the flow path of the first stream 120 through the flow module 110 is shown in FIG. 13. Viewing FIG. 12 and FIG. 13, it can be seen how the bypass path follows along an inner sidewall of the flow module 110 around the measurement zone 102 of the turbidity sensor 100. In this way, the specialized flow path retards or eliminates bubbles in the fluid from passing through the measurement zone 102 of the turbidity sensor 100, or otherwise causes the bubbles to flow around the measurement zone 102 and out the outlet 114 of the flow module 100, not interfering with the turbidity measurements of the turbidity sensor 110 light source. The specialized flow path can be accomplished through a combination of buoyancy and seals that allow the bubbles in the fluid stream to flow outside of the measurement zone 102 of the turbidity sensor 100. As a result of retarding the bubbles from flowing through the measurement zone 102 of the turbidity sensor 100, the accuracy of the turbidity sensor 100 is thereby improved.

Figure 14:
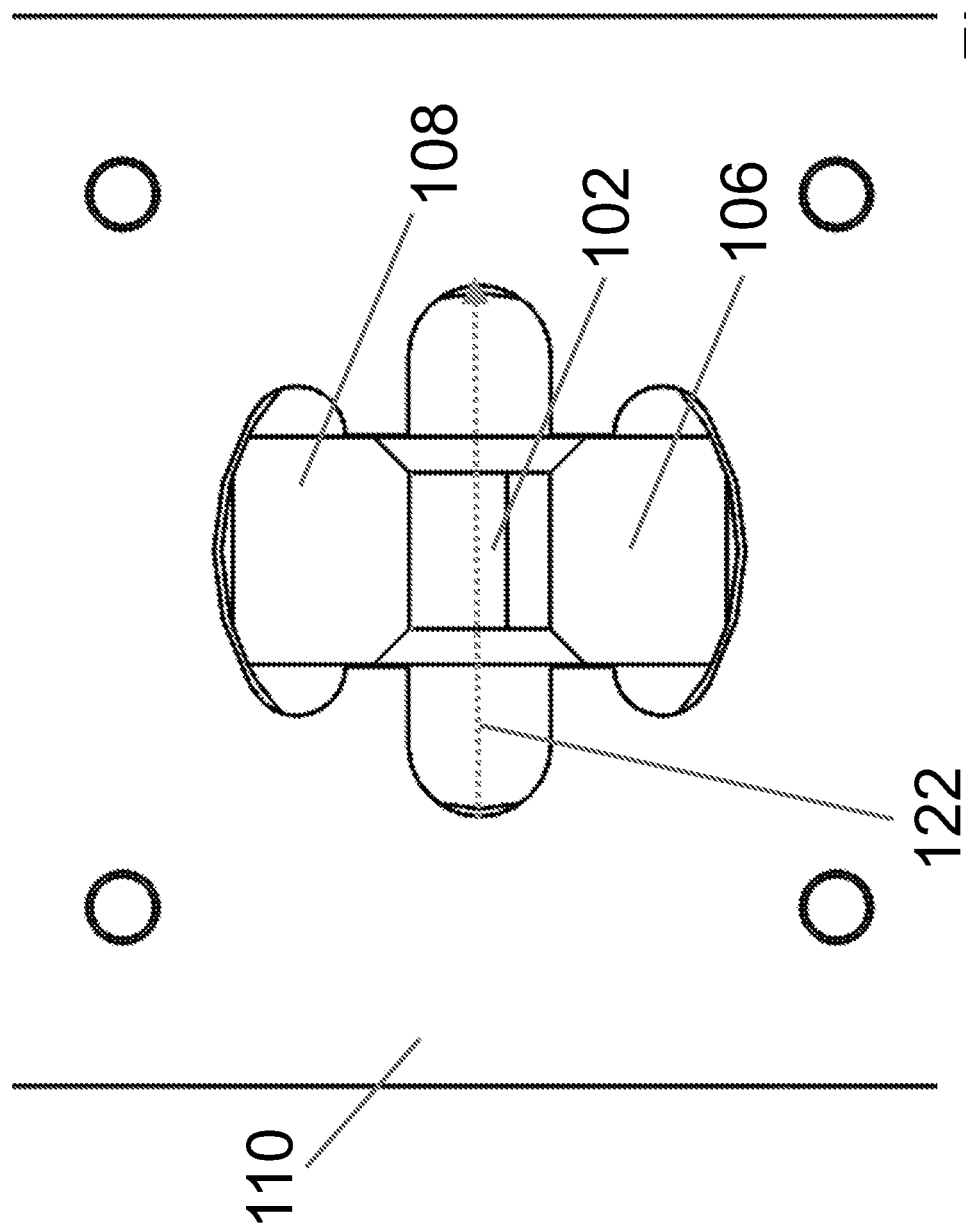
FIG. 14 is a top view of the first exemplary flow module of FIG. 8 illustrating the flow path of a fluid stream relatively free of bubbles through the flow module.

In comparison to the first stream 120, the second stream 122 containing relatively fewer bubbles flows through the measurement zone 102 of the turbidity sensor 110, as shown in FIG. 12, permitting the turbidity sensor to measure the turbidity of the second stream. Another view of the flow path of the second stream 122 through the flow module 110 is shown in FIG. 14. As can be seen in FIG. 12 and FIG. 14, the second stream 122 flows from the inlet 112 of the flow module 110 to the outlet 114 of the flow module 110, with the second stream 122 passing through the area into which the measurement zone 102 of the turbidity sensor 100 is inserted.

Referring now back to FIGS. 8-11, the interior of the flow module includes a front surface 124 and a rear surface 126 that are located so as to leave a gap 125 between the front surface 124 and the prongs 106 of the turbidity sensor. As best seen in FIG. 9, the interior wall is shaped against sides 119, 121 to include another gap 127 between a side surface 128 and the prong 106. The gap 127 is spaced away from the inner floor 129 of the flow path, closer to a top of the flow module, and is located above the measurement zone 102. The gap 127 is shown here with a somewhat triangular shape, through this particular shape is not significant. Referring now to FIG. 12, these gaps 125, 127 form a bypass path that permits fluid to travel up and around the measurement zone 102. Bubbles prefer to rise upwards because they are less dense than the fluid, and so the fluid flowing through the bypass path contains relatively more bubbles compared to the fluid 122 flowing horizontally through the measurement area. This shape also discourage bubbles from accumulating within the measurement zone 102.

Figure 15:
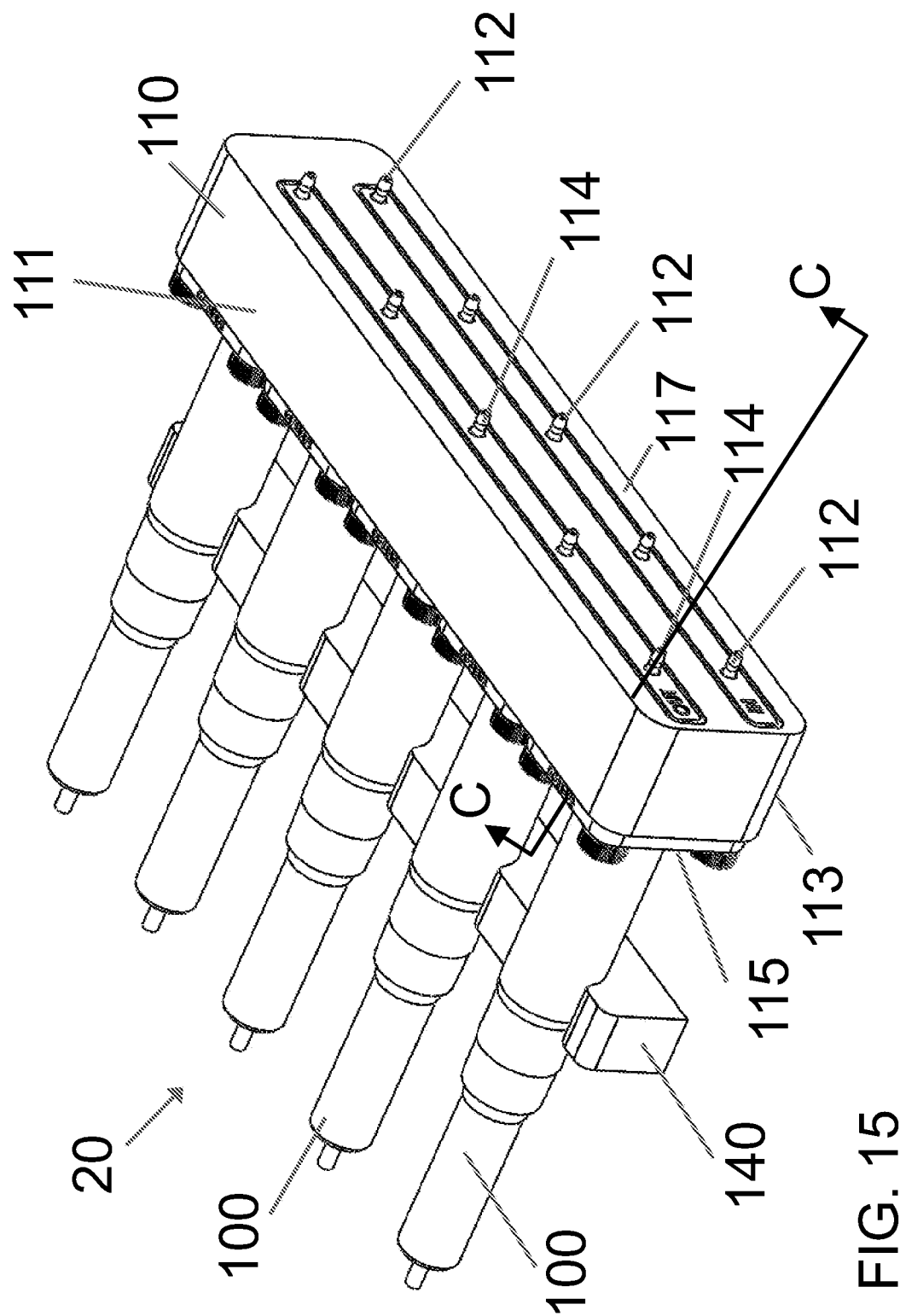
FIG. 15 is a perspective view of a second exemplary system according to the present disclosure. The system includes a flow module having a plurality of openings and a plurality of turbidity sensors engaging with the flow module, with the turbidity sensors in a horizontal configuration.
Figure 16:
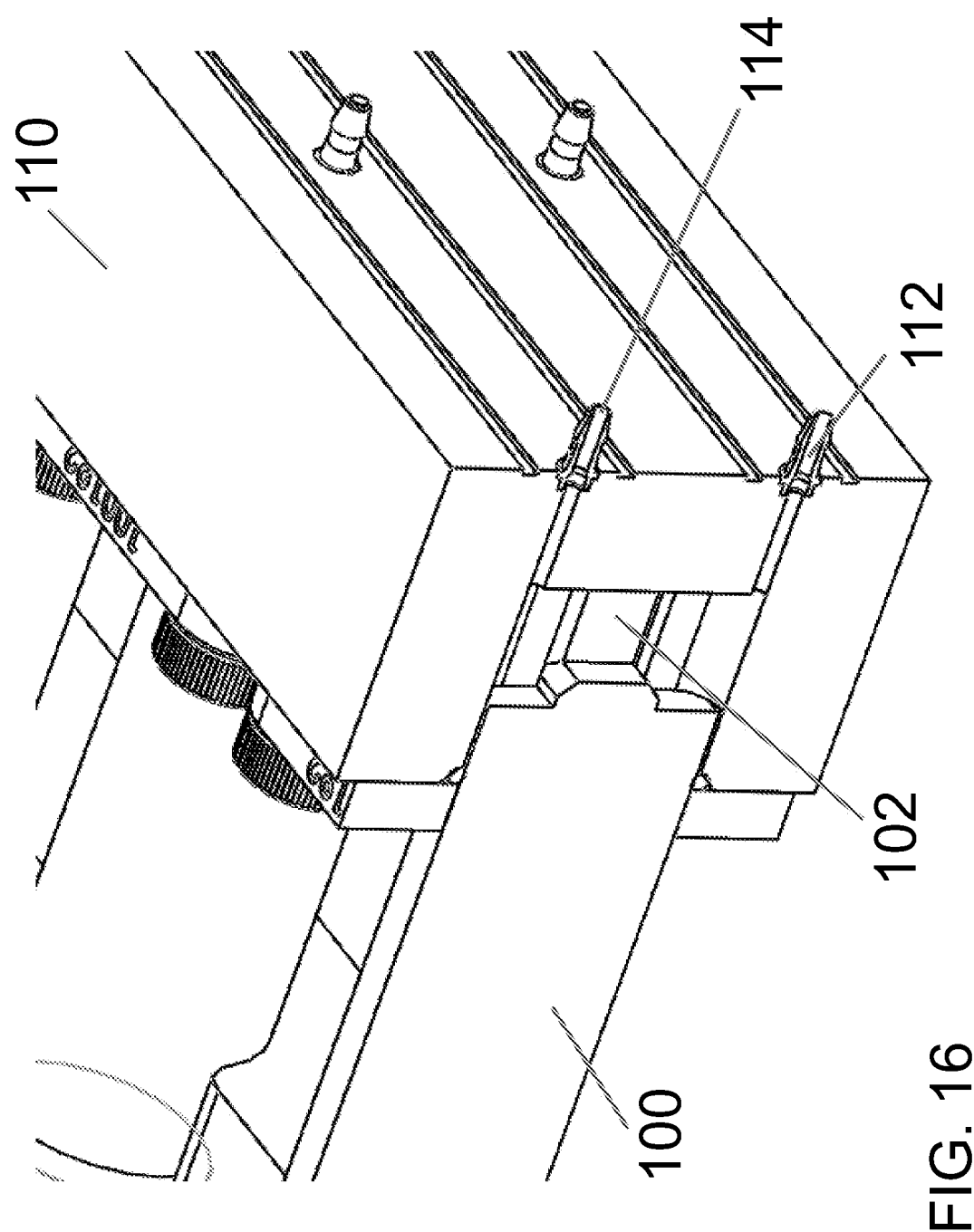
FIG. 16 is a perspective cross-sectional view of the second exemplary system of FIG. 15, along line C-C of FIG. 15.

Turning now to FIG. 15 and FIG. 16, a second exemplary system 20 is shown. System 20 includes several turbidity sensors 100 in engagement with a flow module 110. Here, the turbidity sensors are in a horizontal orientation instead of a vertical orientation. The plurality of turbidity sensors 100 can rest on a cradle 140 configured to hold the plurality of turbidity sensors 100 in engagement with the flow module 110. Each turbidity sensor 100 extends into the flow module 100 through a corresponding opening (not visible) in the first side 115 of the flow module 100. The openings in the flow module 110 of system 20 can be similar to or the same as opening 116 of flow module 110 of system 10, which was described in detail above. Each opening in the flow module is generally configured to receive a single turbidity sensor, such that the number of openings in the flow module 110 is equal to the number of turbidity sensors 100. The flow module 110 of system 20 is divided into a series of compartments, each compartment having an opening for a turbidity sensor. Each compartment also includes an inlet 112 and an outlet 114. In flow module 110 of system 20, both the inlet 112 and the outlet 114 are located on the same side (second side 117) of the flow module, rather than on opposite sides as in the flow module of FIG. 8. Each inlet-outlet pair is generally configured to provide fluid ingress and egress to the measurement zone of a single turbidity sensor, such that the number of inlets 112 and outlets 114 in the flow module 110 of system 20 is equal to the number of openings in the flow module 110 (i.e., equal to the number of turbidity sensors 100 of system 20). In exemplary system 20 depicted in FIG. 15 and FIG. 16, five turbidity sensors 100 are depicted, though it is to be understood that any desired number of turbidity sensors can be placed in engagement with a single flow module by providing more or less openings, inlets, and outlets in the flow module. Each outlet 114 is located above the inlet 112, such that fluid flow is upwards. It is contemplated that this setup would be used for turbidity measurements of several different fluids. For example, this system could be used to measure the turbidity of the fluid in five different bioreactors.

As seen in FIG. 16, in the horizontal orientation, the measurement zone 102 is still located between the inlet 112 and outlet 114. Here, a bypass path is not present as in the vertical orientation. Rather, although bubbles flow through the measurement zone 102, the bubbles do not accumulate in the measurement zone, and so do not distort the readings over time.

The systems and methods described herein are useful for increasing the accuracy of a turbidity sensor. In this regard, one specifically contemplated area of application for the systems and methods of the present disclosure is for determining the reduction in turbidity (measured in NTUs) for a mammalian cell bioreactor and the subsequent filtration of the cells and cell debris from the bioreactor, leaving behind the expressed target proteins (monoclonal antibodies and recombinant proteins) that are the target of the bioreactor process. One example of mammalian cells that may be utilized in this process are CHO (Chinese hamster ovary) cells. The flow rates through these systems can range from about 0.1 milliliters per minute (mL/min) to about 4 liters per minute (L/min).

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A system for measuring the turbidity of a fluid, the system comprising:
    a flow module with a flow path defined therethrough and an opening in communication with the flow path;
    the opening being configured to receive a turbidity sensor that includes a measurement zone defined between two parallel coextensive prongs and that includes a light source;
    the opening being further configured engage the turbidity sensor such that the measurement zone is within the flow path; and
    a gap between an outer sidewall of at least one of the two prongs and an inner wall of the opening and located above the measurement zone and configured to accommodate bubbles in the fluid to permit bubbles in the fluid to travel along the flow path via the gap and outside the measurement zone.

2. The system of claim 1, wherein the flow path further comprises an inlet and an outlet of the flow module.

3. The system of claim 2, wherein the inlet and outlet are located on opposite sides of the flow module.

4. The system of claim 2, wherein the inlet and the outlet are located on a same side of the flow module.

5. The system of claim 1 wherein the opening is located on a top of the flow module.

6. The system of claim 2, wherein the opening in the flow module is located on a different side of the flow module than the inlet and the outlet.

7. The system of claim 2, wherein the inlet is located below the measurement zone of the turbidity sensor.

8. The system of claim 2, wherein the inlet is located closer to a bottom end of the flow module than is the outlet.

9. The system of claim 1, wherein the turbidity sensor is an optical turbidity sensor selected from the group consisting of a single beam turbidity sensor, a ratio beam turbidity sensor, a modulated four beam turbidity sensor, a surface scatter turbidity sensor, and a transmittance turbidity sensor.

10. The system of claim 1, further comprising a plurality of turbidity sensors, each turbidity sensor extending into the flow module through a corresponding opening in the flow module.

11. The system of claim 1, wherein the gap is configured as a bypass path that does not pass through the measurement zone.

12. The system of claim 11, wherein the bypass path runs between an inner wall of the flow module and an outer sidewall of the turbidity sensor, above and around the measurement zone.

13. A method for increasing the accuracy of a turbidity sensor, the method comprising:
   flowing a fluid containing bubbles into a system, the system comprising:
      a flow module with a flow path defined therethrough and an opening in communication with the flow path;
      the opening being configured to receive a turbidity sensor that includes a measurement zone defined between two parallel coextensive prongs and that includes a light source;
      the opening being further configured engage the turbidity sensor such that the measurement zone is within the flow path; and
      a gap between an outer sidewall of at least one of the two prongs and an inner wall of the opening and located above the measurement zone and configured to accommodate bubbles in the fluid to permit bubbles in the fluid to travel along the flow path via the gap and outside the measurement zone; and
   placing the turbidity sensor in engagement with the opening such that the two prongs of the turbidity sensor are disposed within the flow path of the flow module and to form the gap; and
   measuring the turbidity of the fluid as the fluid flows through the measurement zone of the turbidity sensor.

14. The method of claim 13, further comprising separating the fluid in the flow module into a first stream of fluid containing relatively more bubbles and a second stream of fluid containing relatively fewer bubbles, the first stream flowing through the gap configured as a bypass path and does not pass through the measurement zone, and the second stream flowing through the measurement zone of the turbidity sensor to be measured.

15. The method of claim 14, wherein the bypass path runs between an inner wall of the flow module and an outer sidewall of the turbidity sensor, above and around the measurement zone.

16. The method of claim 13, wherein the flow path further comprises an inlet and an outlet of the flow module.

17. The method of claim 16 wherein both the inlet and the outlet of the flow module are located along a same side thereof.

18. The method of claim 16, wherein the inlet of the flow module is located below the measurement zone of the turbidity sensor.

19. A system for measuring the turbidity of a fluid, the system comprising:
   a flow module with a flow path that includes an outlet, the flow module including an opening for receiving a turbidity sensor with a measurement zone configured to pass the fluid therethrough, the opening communicating with the flow path;
   wherein the opening is further configured to engage with the turbidity sensor to permit the measurement zone to be disposed within the flow path of the flow module and the outlet is located above the measurement zone when the turbidity sensor engages with the opening; and
   a prong on a perimeter of the measurement zone and defining a gap between an outer sidewall of the prong and an inner wall of the opening when the turbidity sensor is placed in the opening to engage with the flow module.

20. The system of claim 19, wherein the flow path further comprises an inlet of the flow module that is located below the measurement zone of the turbidity sensor when the turbidity sensor is placed in the opening to engage with the flow module.

* * * * *